(12) United States Patent
Dong et al.

(10) Patent No.: US 9,615,241 B2
(45) Date of Patent: Apr. 4, 2017

(54) REPORT OF SERVICING NETWORK, TIME ZONE AND UCI

(71) Applicant: TELEFONAKTIEBOLAGET L M ERICSSON (PUBL), Stockholm (SE)

(72) Inventors: Mei Dong, Shanghai (CN); Zhiwei Qu, Shanghai (CN); Yong Yang, Kållered (SE); Dongmei Zhu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 132 days.

(21) Appl. No.: 14/426,020

(22) PCT Filed: Oct. 5, 2012

(86) PCT No.: PCT/EP2012/069770
§ 371 (c)(1),
(2) Date: Mar. 4, 2015

(87) PCT Pub. No.: WO2014/053193
PCT Pub. Date: Apr. 10, 2014

(65) Prior Publication Data
US 2015/0215768 A1 Jul. 30, 2015

(51) Int. Cl.
*H04W 8/08* (2009.01)
*H04W 8/06* (2009.01)
(Continued)

(52) U.S. Cl.
CPC ............... *H04W 8/08* (2013.01); *H04W 8/06* (2013.01); *H04W 64/006* (2013.01); *H04W 92/24* (2013.01)

(58) Field of Classification Search
CPC ....... H04W 64/006; H04W 8/06; H04W 8/08; H04W 84/06; H04B 7/18528; H04B 7/18571; H04B 7/18576
(Continued)

(56) References Cited

U.S. PATENT DOCUMENTS

2007/0149190 A1 6/2007 Matsuhashi
2012/0189016 A1* 7/2012 Bakker ............... H04W 76/021
370/401
(Continued)

FOREIGN PATENT DOCUMENTS

RU 2370911 C2 10/2009

OTHER PUBLICATIONS

European Communication dated Jul. 6, 2016, issued in European Patent Application No. 12770120.9, 5 pages.
(Continued)

*Primary Examiner* — Chi H Pham
*Assistant Examiner* — Robert Lopata
(74) *Attorney, Agent, or Firm* — Rothwell, Figg, Ernst & Manbeck, P.C.

(57) ABSTRACT

The embodiments herein relate to a method in a mobility management node for handling information in a network. The node is associated with a wireless device being served by a serving network. The node obtains information about that at least one of the serving network and a time zone and a UCI, has been changed for the device, and information about that the change has not been transmitted to a SGW. When at least one of the serving network and the time zone and the UCI, has been changed, and information about the change has not been transmitted to the SGW, the node transmits the information about at least one of the changed serving network and time zone and UCI, to the SGW, enabling the SGW to forward this information to a PGW.

15 Claims, 8 Drawing Sheets

(51) Int. Cl.
*H04W 64/00* (2009.01)
*H04W 92/24* (2009.01)

(58) Field of Classification Search
USPC .......................................................... 370/328
See application file for complete search history.

(56) References Cited

U.S. PATENT DOCUMENTS

| | | | | |
|---|---|---|---|---|
| 2012/0224564 A1* | 9/2012 | Paisal | ................... | H04N 7/148 370/331 |
| 2012/0307798 A1* | 12/2012 | Zhou | ...................... | H04W 4/00 370/331 |
| 2013/0053027 A1* | 2/2013 | Lau | ...................... | H04W 76/022 455/432.1 |
| 2013/0107863 A1* | 5/2013 | Faccin | .............. | H04W 36/0022 370/331 |
| 2013/0163559 A1* | 6/2013 | Wang | ...................... | H04W 8/08 370/331 |
| 2014/0133456 A1* | 5/2014 | Donepudi | ............ | H04W 84/18 370/331 |
| 2014/0192739 A1* | 7/2014 | Liao | ........................ | H04W 8/22 370/329 |
| 2015/0201394 A1* | 7/2015 | Qu | .......................... | H04W 4/02 455/456.1 |

OTHER PUBLICATIONS

Huawei, "User CSG Information in TAU/RAU procedures", 3GPP Draft; C4-113165(Was 113056)_User CSG Information in Taurau Procedures_29274_REL9, 3rd Generation Partnership Project (3GPP), Mobile Competence Centre ; 650, Route Des Lucioles ; F-06921 Sophia-Antipolis Cedex ; France, (Nov. 18, 2011), vol. CT WG4, No. San Francisco, US; Nov. 14, 2011-Nov. 18, 2011, XP050559688, 180 pages.
3GPP, 3rd Generation Partnership Project; Technical Specification Group Services and System Aspects; General Packet Radio Service (GPRS) enhancements for Evolved Universal Terrestrial Radio Access Network (E-UTRAN) access (Release 11), 3GPP TS 23.401, V11.2.0, 2010, 285 pages.
3GPP, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11), 3GPP TS 29.274, V11.4.0, 2012, 219 pages.
Ericsson et al. "Support for inter PLMN mobility" 3GPP TSG SA WG2 Meeting #83, S2-111210, 2011, 53 pages.
Translation of the Notification of Reasons for Refusal issued by the Japanese Patent Office in related Application No. JP 2015-533463, datedJan. 19, 2016, 2 pages.
Office Action dated Jul. 22, 2016, issued in Russian Patent Application No. 2015115961/08(024860), 11 pages.

* cited by examiner

Figure 3: S4-SGSN solution to Piggyback SN/UCI

Fig. 4 Mobility

Figure 5: Inter-SGSN/MME RAU/TAU

Figure 6: Inter-SGSN/MME Handover

REPORT OF SERVICING NETWORK, TIME ZONE AND UCI

CROSS REFERENCE TO RELATED APPLICATION(S)

This application is a 35 U.S.C. §371 National Phase Entry Application from PCT/EP2012/069770, filed Oct. 5, 2012, designating the United States, the disclosure of which is incorporated herein in its entirety by reference.

TECHNICAL FIELD

Embodiments herein relate generally to a mobility management node and a method in the mobility management node. More particularly the embodiments herein relate to handling information in a communications network.

BACKGROUND

In a typical communications network, also referred to as a wireless communications system, wireless communications network, a cellular network, a communications network or a communications system, a device, communicates via a Radio Access Network (RAN) to one or more Core Networks (CNs).

The device may be a device by which a subscriber may access services offered by an operator's network and services outside operator's network to which the operators radio access network and core network provide access, e.g. access to the Internet. The device may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The device may be portable, pocket storable, hand held, computer comprised, or vehicle mounted devices, enabled to communicate voice and/or data, via the radio access network, with another entity, such as another device or a server.

Devices are enabled to communicate wirelessly with the communications network. The communication may be performed e.g. between two devices, between a devices and a regular telephone and/or between the devices and a server via the radio access network and possibly one or more core networks and possibly the Internet.

The communications network covers a geographical area which may be divided into cell areas, and therefore also called a cellular network. Each cell area is served by a base station, e.g. a Radio Base Station (RBS), which sometimes may be referred to as e.g. evolved Node B (eNB), eNodeB, NodeB, B node, or Base Transceiver Station (BTS), depending on the technology and terminology used. The base station communicates with the device within range of the base station.

The device may be in different modes: idle mode or connected mode. A mode may also be referred to as a state. In idle mode, the device is e.g. not in a call, i.e. the device is not "doing anything" and does not have any context activated. When the device is in connected mode, it is in e.g. a call, i.e. the device is "doing something". Data is transmitted between the device and the network only when the device is in connected mode.

In addition to the device, the communications network comprises a plurality of nodes in the access network and the core network. Such nodes may be for example a GGSN, SGSN, MME, PGW or SGW. GGSN is an abbreviation of Gateway GPRS Support Node and SGSN is an abbreviation of Serving GPRS Support Node, where GPRS is an abbreviation for General packet radio service. MME is an abbreviation of Mobility Management Entity. PGW is an abbreviation of PDN Gateway, where PDN is an abbreviation of Packet Data Network. SGW is an abbreviation of Serving Gateway. The GGSN is a network gateway node responsible for the interworking between the GPRS core network and external packet switched networks, for example the Internet. The GGSN has Internet Protocol (IP) on both sides. Similarly, the PGW is a network gateway node responsible for the interworking between the Long Term Evolution (LTE) core network and external packet switched networks, for example the Internet.

The communications network comprises a mobility management node which may be a SGSN for 2G GSM and 3G UMTS access and MME for LTE access. The SGSN may further be classified to S4-SGSN (based on GTPv2) and Gn/Gp SGSN (based on GTPv1). The SGSN is a network node responsible for the delivery of data packets from and to the devices within its geographical service area. The SGSN provides control function and manages states, paging, authentication, mobility, roaming, and other bearer management functions. The SGSN is an access point for the device to the packet network. The SGSN understands radio access on one side and IP on the other side. The SGSN may be a S4-SGSN which is a SGSN which supports the S4 interface. The MME is a control node for the access network. The SGSN and the MME may be implemented in one physical node, and then it may be referred to as SGSN/MME. The SGSN and the MME may also be separate physical nodes. The term mobility management node is used in the following text in order to refer to the S4-SGSN, MME and the combined SGSN/MME.

As already indicated above, the PGW is a node which provides connectivity from the device to external packet data networks by being the point of exit and entry of traffic for the device. The SGW is a node which routes and forwards user data packets, while also acting as the mobility anchor for the user plane during inter-eNodeB handovers and as the anchor for mobility between Long Term Evolution (LTE) and other Third Generation Partnership Project (3GPP) technologies.

A Public Land Mobile Network (PLMN) is a network providing land mobile communications services to the public. The PLMN provides communication possibilities for devices. Each operator providing mobile services may have its own PLMN. Access to PLMN services is achieved by means of an air interface involving communications between devices. The PLMN is connected to the Public Switched Telephone Network (PSTN) in order to route calls. According to the 3GPP, a PLMN area is the geographical area in which a PLMN provides communication services to devices. In general the PLMN is limited by the borders of a country. Depending on national regulations there may be more than one PLMN per country.

The device may be located in and served by one PLMN and changes to another PLMN, i.e. it changes Serving Network (SN), for example when the device moves from one country to another country. PLMN change is one of SGW-CDR and PGW-CDR closure triggers and serving network, i.e. Serving Node PLMN Identifier, which indicates the serving node PLMN, Mobile Country Code (MCC)

and Mobile Network Code (MNC), used during this record is an essential field in SGW-CDR and PGW-CDR. CDR, short for Charging Data Record, is a formatted collection of information about a chargeable event for use in billing and accounting. Examples of such chargeable event are time of call setup, duration of the call, amount of data transferred, etc. Both the MCC and the MNC are parts of the International Mobile Subscriber Identity (IMSI). CDRs may be classified with two parameters:

The node at which they are generated: GGSN, SGSN, PGW, SGW, etc.

The type of service or activity they are charging: Multimedia Broadcast Multicast Services (MBMS), Mobility, Location request etc.

A serving network may be defined as a network that the device has registered with. The serving network may be identified with a serving network ID. The serving network may also be referred to as the serving PLMN. A device may register with more than one network at a time. A device may change from being served by a source serving network to being served by a target serving network, and consequently being registered with the same mobility management node or changing from being registered with a source mobility management node to a target mobility management node. In the following, the terms source is associated with a previous location of the device and the term target is associated with a current or future location of the device. The term old may be used instead of source and the term new may be used instead of target.

PLMN information is also important for Policy and Charging Control (PCC). To keep the SGW and PGW updated with the latest information about the serving network without side-effect, e.g., too much signaling, duplicated reporting caused, it is critical for a mobility management node to report information about the serving network precisely and smartly.

Two kinds of interfaces need to be updated to form a comprehensive solution for reporting information about the serving network.

Serving Network Change Reporting without Change of Mobility Management Node (Non-Mobility)

In the 3GPP specification, a delayed reporting mechanism is adopted for a device in idle mode whose procedure for intra-mobility management node serving network change does not inherently comprise sending, from the serving mobility management node, a Modify Bearer Request (MBR) message to the SGW and with the assumption that a service request procedure, where one modify bearer request message for each Packet Data Network (PDN) is mandatory, will be initiated when the device enters connected mode.

Thus, a modify bearer request during a service request will anyway carry a serving network Information Element (IE) to the PGW via the SGW. The serving network IE is the identification of the serving network. This delayed reporting mechanism tends to avoid extra signaling to gateways. However, the service request procedure may not always happen when the device goes from idle to connected mode for some scenarios. The service request mentioned above is a procedure used by the device or the network to which there is uplink or downlink data to send, in order to establish radio access bearer.

In this non-mobility procedure, the mobility management node is a S4-SGSN or a combined SGSN/MME.

Intra-mobility management node serving network change, as mentioned above, refers to the case when the device changes serving network while still being connected to the same mobility management node, i.e. without changing mobility management node. This may also be referred to as a non-mobility procedure, since there is no change of mobility management node.

However, the service request procedure will not always happen when the device changes from idle mode to connected mode for some embodiments.

The 3GPP has agreed that the mobility management node shall include the serving network IE in the modify bearer request transmitted to the SGW only when the serving network has changed.

Meanwhile, the 3GPP SA2 has agreed that the serving PLMN change reporting may be delayed when the device is in ECM_IDLE state, i.e. in case the serving PLMN changes during intra-Tracking Area Update (TAU) with no user plane setup, the MME may report the changed serving PLMN to the SGW in the next Service Request procedure. ECM is short for Evolved packet system (EPS) Connection Management and ECM_IDLE is a state describing signaling connectivity between the device and the Evolved Packet Core (EPC). The device is in ECM_IDLE state when there is no Non Access Stratum (NAS) signaling connection between the device and the network. The device in ECM_IDLE state performs cell selection or reselection and PLMN selection.

In case of a tracking area update without the change of mobility management node, a change of serving network, Time Zone (TZ) or User CSG Information (UCI) is signaled in the next service request. This delayed reporting for an idle device applicable for a S4-SGSN, which is a SGSN supporting the S4 interface. The device initiated service request when Idle-mode Signaling Reduction (ISR) is not active, but the serving network has changed during previous mobility procedures, i.e. intra-mobility management node tracking area update/Routing Area Update (RAU) and the change has not been reported to the PGW yet.

CSG is short for Closed Subscriber Group. According to the 3GPP a closed subscriber group identifies subscribers of an operator who are permitted to access one or more cells of the PLMN but which have restricted access. The CSG may be identified with a unique identifier called CSG Identity (CSG ID), which is used by the device to facilitate access for authorized members of the CSG. The CSG ID is comprised in UCI. The UCI further comprises access mode and CSG membership indication. A CSG subscriber server may stores CSG subscription data for roaming devices.

The reporting principle in the 3GPP is clear that though the reporting of the serving network is mandatory, the potential signaling flooding towards the SGW and/or the PGW should be avoided, and it is not necessary to report the serving network change immediately when the device is in idle mode. However, with the existing approach for reporting the change of the serving network for idle devices, the SGW and/or the PGW will fail to get the latest information about the serving network in the following scenarios:

In Wideband Code Division Multiple Access (WCDMA), after the device performs intra-routing area update with serving network changes and returns to idle: In the subsequent service request, the S4-SGSN may selectively setup the Radio Access Bearer (RAB) for those bearer contexts having payload pending to save radio resource. Therefore, the serving network change is only reported to those PDN connections for which the S4-SGSN has setup a radio access bearer.

In WCDMA, after the device performs intra-routing area update with the serving network changes and returns to idle: The PGW initiates a bearer create or bearer update or bearer delete operation, and the S4-SGSN may not setup user plane for other bearers. Thus, there will be no modify bearer request message within the procedure. After the Bearer create/update/delete, the SGW/PGW is not informed about the latest serving network.

In WCDMA, when a direct tunnel is not used: There will be no modify bearer request in the service request procedure. Thus, the subsequent service request may not be relied on to report the serving network change.

In Global System for Mobile Communications (GSM): There is no Service Request procedure, i.e. there is no additional modify bearer request message to be sent to the SGW when the device turns from idle to ready state according to the existing specification.

The direct tunnel mentioned above, is a feature that allows the mobility management node to establish a direct user plane tunnel between the radio access network, e.g. a Radio Network Controller (RNC) and the SGW.

Serving Network Change Reporting with Change of Mobility Management Node (Mobility)

3GPP states that, the serving network IE should be comprised in the forward relocation request message with the purpose of providing necessary information to the target mobility management node to judge when there is a change of serving network.

In case of inter-mobility management node idle mobility, e.g. tracking area update/routing area update, the target mobility management node may compare the PLMN in a Globally Unique Temporary ID (GUTI)/old Routing Area Identification (RAI) with the PLMN in the current Tracking Area Identity (TAI)/RAI. The TAI is the identity of the tracking area and the RAI is the identity of the routing area.

In the mobility procedure, the mobility management node is a S4-SGSN, a standalone MME or a combined SGSN/MME.

As mentioned above, inter-mobility management node serving network change refers to the case when the device changes serving network and also changes from being connected to a source mobility management node to a target mobility management node. This may also be referred to as a mobility procedure, since there is a change of mobility management node.

This information is not sufficient in order for the target mobility management node to know whether the latest information about the serving network has been reported to the gateway, i.e. SGW and PGW, or not.

During inter-mobility management node idle mobility, e.g. tracking area update/routing area update, the target mobility management node knows the PLMN used in source MME via GUTI, in the source mobility management node via/old RAI with the PLMN in the current TAI/RAI. During inter-mobility management node handover, the source mobility management node includes the serving network IE in a forward relocation request message to assist the target mobility management node to check when there is a serving network change which is the precondition of serving network reporting.

The target mobility management node compares the source serving network and target/current serving network, and takes further action accordingly: When the serving network has changed, or when the mobility management node has not received any source serving network information from the source mobility management node, the mobility management node includes the new serving network IE in this message, i.e. the modify bearer request.

However, the target mobility management node does not have the knowledge whether the latest serving network information has been reported to the SGW or not, e.g. when the serving network of the device does not change, there is still possibility that the source mobility management node (e.g. SGSN/MME) has not reported information about the serving network to the SGW due to the "delayed reporting mechanism".

Admittedly, as the existing 3GPP described, the target mobility management node will surely report the new serving network when it detects the serving network changes during the inter-mobility management node mobility without a SGW relocated procedure. But the target mobility management node will not report the current serving network when the serving network has not changed according to the condition specified in the current 3GPP specification. Based only on the the received serving network IE the target mobility management node will not be able to decide whether to report the information about the serving network or not in the case of the serving nework is not changed due to lack of the report status information which indicates when the source mobility management node has already reported the serving network or not to the SGW, as it is possible that the source mobility management node may have reported or have not reported it yet due to "Delay Reporting" mechanism for an idle device.

With this fact of lacking status report information, the target mobility management node will be in a dilemma of reporting or not for this unchanged serving network for those moving in devices. When the serving network is reported anyway, it may cause duplicated reporting thus unnecessary signalling load will ensue due to the speculation that the serving network unchanged mobility might be the most likely cases among all inter-mobility management node mobility cases. When the serving network has not been reported, then the serving network in the SGW/PGW may not be updated, consequently some problems will be caused, e.g., wrong information in the SGW-CDR and PGW-CDR.

Report of Time Zone and UCI

The aforementioned problem for reporting the serving network exists also for the report of Time Zone (TZ) and UCI. The time zone and the UCI are related to the device, i.e. the time zone in which the device is located and the UCI is related to the closed subscriber group to which the device belongs.

SUMMARY

An objective of embodiments herein is therefore to obviate at least one of the above disadvantages and to provide enhanced reporting of at least one of the serving network and time zone and UCI.

According to a first aspect, the object is achieved by a method in a mobility management node for handling information in a communications network. The mobility management node is associated with a wireless device being served by a serving network. The mobility management node obtains information about that at least one of the serving network or a time zone or a UCI has been changed for the wireless device, and information about that the change has not been transmitted to a SGW 105 associated with the mobility management node. When at least one of the serving network and the time zone and the UCI, has been changed for the wireless device, and information about the change has not been transmitted to the SGW, the mobility management node transmits the information about at least one of the changed serving network and time zone and UCI to the SGW, enabling the SGW to forward this information to a PGW.

According to a second aspect, the object is achieved by a mobility management node for handling information in a communications network. The mobility management node is configured to be associated with a wireless device being served by a serving network. The mobility management node comprises an obtaining unit which is configured to obtain information about that at least one of the serving network or a time zone or a UCI has been changed for the wireless device, and information about that the change has not been transmitted to a SGW associated with the mobility management. The mobility management node comprises a transmitter which is configured to, when at least one of the serving network and the time zone and the UCI has been changed for the wireless device, and when information about the change has not been transmitted to the SGW transmit the information about at least one of the changed serving network and time zone and UCI, to the SGW, enabling the SGW to forward this information to a PGW.

Since the mobility management node transmits the information about the changes in at least one of serving network and time zone and UCI to the SGW only when the information has changed and when it has not previously been reported, the reporting is performed with the least additional signaling and thus the reporting of at least one of serving network and time zone and UCI is enhanced.

Embodiments herein afford many advantages, of which a non-exhaustive list of examples follows:

The embodiments herein solve a critical issue of reporting information about at least one of serving network and time zone and UCI in the EPC network environment with minimum signalling impact, e.g. additional S5/S8 signalling to report a serving network change is avoided. Meanwhile, the very purpose of strengthening the target mobility management nodes serving network reporting capability, i.e., the serving network is only reported when it changes, is fulfilled by delivering a report status together with a serving network to the target mobility management node. Note that S5/S8 is the interface between the SGW and the PGW. S8 is used when the device roams between different operators, while S5 is network internal.

The embodiments herein provide an advantage of saving radio resources, i.e. covered by the scenario that the SGSN selectively sets up a radio access bearer for an EPS bearer with a payload pending in order to be carried by the EPS bearer to the device.

Another advantage of the embodiments herein is that 3GPP specifications are improved and some GPRS Tunneling Protocol version 2 (GTPv2) messages conveyed in these interfaces are enhanced: S11 (MME-SGW), S4 (S4-SGSN-SGW), S16 (S4-SGSN-S4-SGSN), S10 (MME-MME), S3 (SGSN-MME), S5/S8 (SGW-PGW).

Furthermore, an advantage of the embodiments herein is that they save the required modify bearer signaling in order to report the change of at least one of serving network and time zone and UCI. When there is no dedicated signaling triggered by the PGW, additional modify bearer request messages per PDN connection to report the change of at least one of the serving network and time zone and UCI are anyway needed, and therefore utilized.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein enhance the report of at least one of the serving network and time zone and UCI, so that the SGW and the PGW has the latest information about at least one of serving network and time zone and UCI in time with the least additional signaling, in both a mobility scenario and a non-mobility scenario. The mobility management node needs sufficient information in order to know whether the latest information about the at least one of the serving network and time zone and UCI has been reported to the SGW and the PGW or not.

The embodiments herein relate to the S4/S11 and/or the S5/S8 interfaces and/or to the S10/S3/S16 interfaces respectively, and with the improvements, the wholesome serving network and/or time zone and/or UCI report mechanism is obtained. The S4 is the interface between the SGSN and the SGW. The S11 is the interface between the MME and the SGW. S5 is the interface between the SGW and the PGW and S11 is the interface between the MME and the SGW. S10 is the interface between multiple MMEs. S3 is the interface between the SGSN and the MME, and S16 is the interface between multiple SGSNs.

Figure 1:
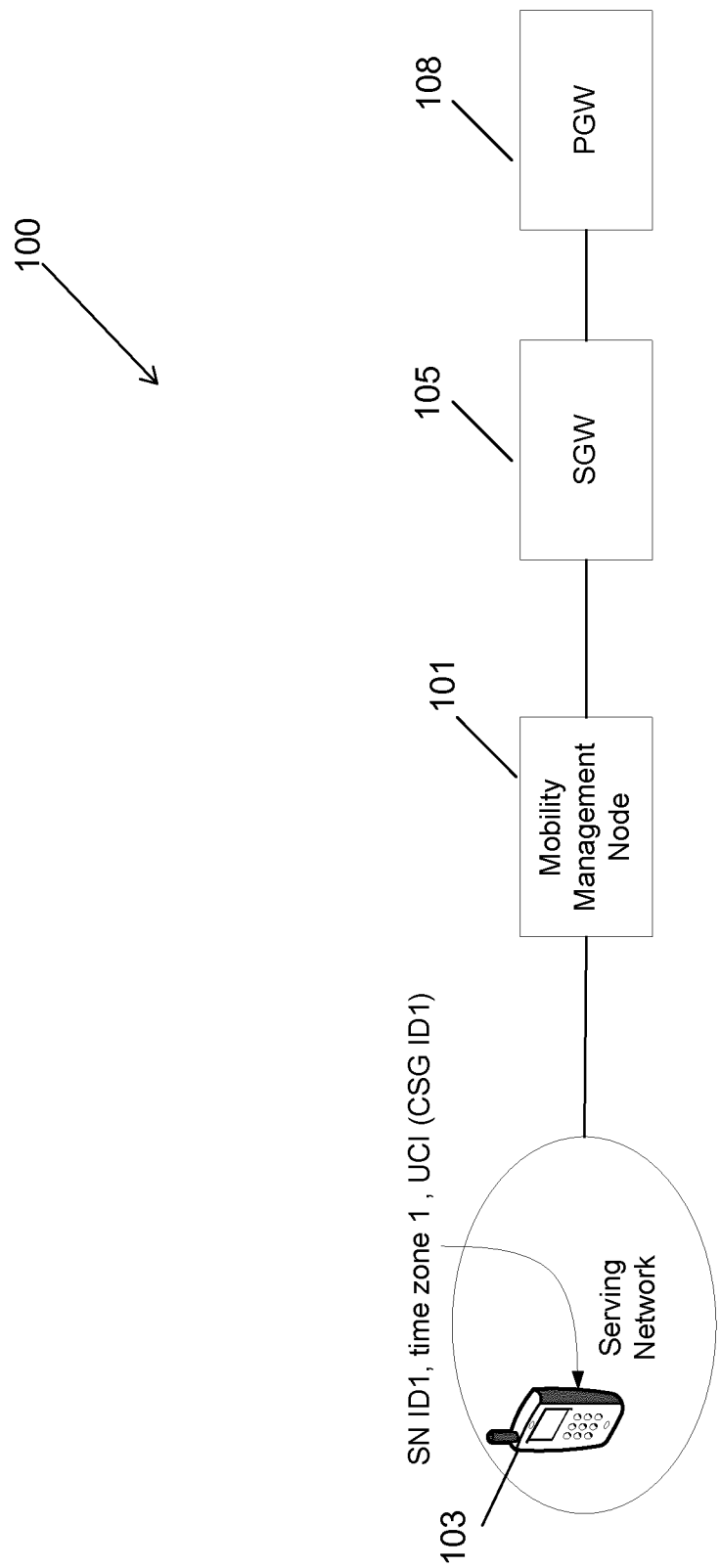
FIG. 1 is a schematic block diagram illustrating embodiments of a communications network.

FIG. 1 depicts a communications network 100 in which embodiments described herein may be implemented. The communications network 100 may in some embodiments apply to one or more radio access technologies such as for example LTE), LTE Advanced, WCDMA, GSM, or any other 3GPP radio access technology, or other radio access technologies such as e.g. Wireless Local Area Network (WLAN).

The communications network 100 comprises a mobility management node 101 which is associated with a wireless device 103. The wireless device 103 is present in and served by a serving network. The serving network has a unique ID, which is referred to as SN ID in some of the drawings. The serving network may comprise multiple routing areas or tracking areas. The mobility management node may be a MME, a combined SGSN/MME or a S4-SGSN.

The wireless device 103 may be a device by which a subscriber may access services offered by an operator's network and services outside operator's network to which the operators radio access network and core network provide access, e.g. access to the Internet. The wireless device 103 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device 103 may be portable, pocket storable, hand held, computer comprised, or vehicle mounted devices, enabled to communicate voice and/or data, via the radio access network, with another entity, such as another device or a server.

The wireless device 103 is enabled to communicate wirelessly with the communications network 100. The communication may be performed e.g. between two wireless devices, between the wireless devices 103 and a server via the radio access network and possibly one or more core networks and possibly the Internet.

The mobility management node 101 is connected to a SGW 105. When the mobility management node 101 is a S4-SGSN, the SGSN 101 has a S4 interface towards the SGW 105, and thereby referred to as a S4-SGSN. When the mobility management node 101 is a combined SGSN/MME, the interface between the combined SGSN/MME and the SGW 105 is the S4/S11 interface. When the mobility management node 101 is a MME, the interface between the MME and the SGW 105 is S11 interface.

The SGW 105 is connected to a PGW 108. When the wireless device 103 is accessing multiple PDNs, there may be more than one PGW 108 for that wireless device 103, but only one PGW 108 is shown here for the sake of simplicity.

Figure 2:
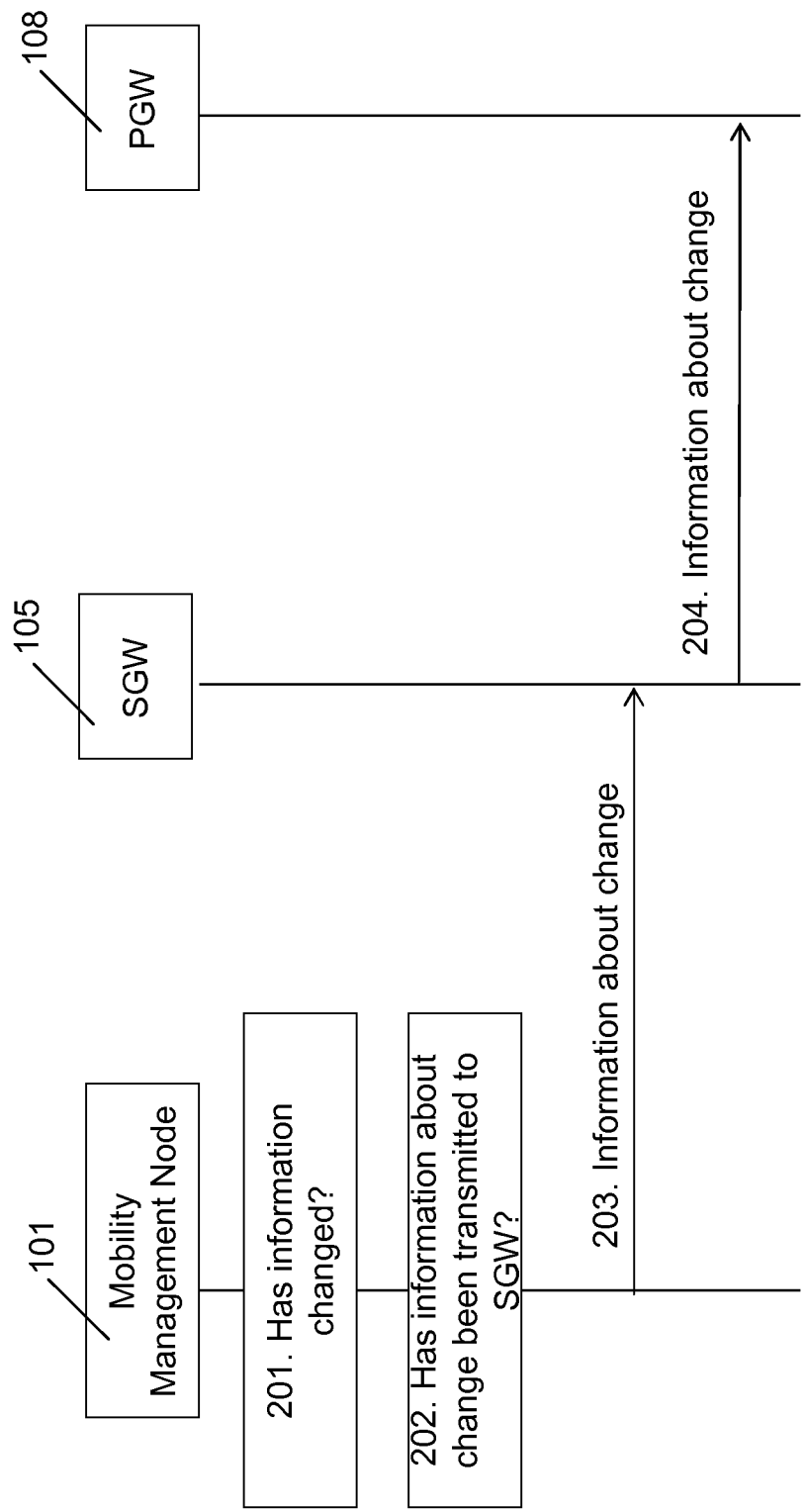
FIG. 2 is a signaling diagram illustrating embodiments of a method in the communications network.

FIG. 2 is a signaling diagram illustrating an embodiment of a method for handling information in the communications network 100, regardless whether there is a mobility or non-mobility associated with the mobility management node. The embodiments herein provide solutions for the mobility management node 101 to fulfill the serving network and/or time zone and/or UCI reporting task, especially when shared network is used. The method comprises the following steps, which steps may be performed in any suitable order:

Step 201

The mobility management node 101 checks whether at least one of the following three parameters has changed: the serving network and/or time zone and/or UCI. When at least one of the serving network and time zone and UCI has not changed, the mobility management node 101 does not take any action. When at least one of the serving network and time zone and UCI has changed, the method proceeds to step 202.

Step 202

When the mobility management node 101 determined in step 201 that at least one of the serving network and time zone and UCI has changed, the mobility management node 101 checks whether the information about the change has been transmitted to the SGW 105 or not. When the information has been transmitted to the SGW 105, the mobility management node 101 does not take any action. When the information has not been transmitted to the SGW 105, the method proceeds to step 203.

Step 203

When at least one of the serving network and time zone and UCI has changed and has not previously been transmitted to the SGW 105, the mobility management node 101 transmits the information about the changed serving network and/or time zone and/or UCI to the SGW 105.

Step 204

When the SGW 105 has received the information about the change, it forwards the information to the PGW 108. The PGW 108 uses the information for e.g. the CDR and reports it to the PCRF for the further policy decision, e.g. a serving network change leads different QoS; UCI change leads different charging rate and so on.

The mobility procedure and the non-mobility procedure will now be described, starting with the non-mobility procedure.

Serving Network/Time Zone/UCI Reporting without Change of Mobility Management Node Change (Non-Mobility)

In this non-mobility procedure, the mobility management node 101 is a S4-SGSN or a combined SGSN/MME, and the S4-SGSN will be used as an example in the following description of the non-mobility. For WCDMA access, the S4-SGSN 101 checks direct tunnel conditions each time a Packet Data Protocol (PDP) context is activated, whether the wireless device 103 is activated or by means of an Inter-SGSN routing area update, an Inter SGSN Inter-Radio Access Technology (IRAT) Packet Switched (PS) handover from GSM to WCDMA systems, or an Inter-SGSN serving radio network subsystem relocation. The direct tunnel allows data traffic to bypass the S4-SGSN 101, significantly increasing network capacity and allowing the S4-SGSN 101 to function as an MME signaling server. When a direct tunnel is not used, either in the intra-routing area update procedure, or in the subsequent device initiated service request procedure, an additional modify bearer request is needed to report at least one of the serving network and time zone and UCI changes.

For GSM access, the S4-SGSN 101 sends an additional modify bearer request to report at least one of the serving network and time zone and UCI changes due to no service request in 2G.

At least one of the serving network and time zone and UCI IEs are introduced in at least one of a create bearer response and update bearer response and delete bearer response messages to piggyback the latest serving network to the SGW 105 when the change is not reported yet.

The S4-SGSN 101 will remember each PDN connection report status. The S4-SGSN 101 only comprises the changed serving network in the modify bearer request messages with for those PDN connections which changes of at least one of serving network and time zone and UCI have not be reported yet.

Figure 3:
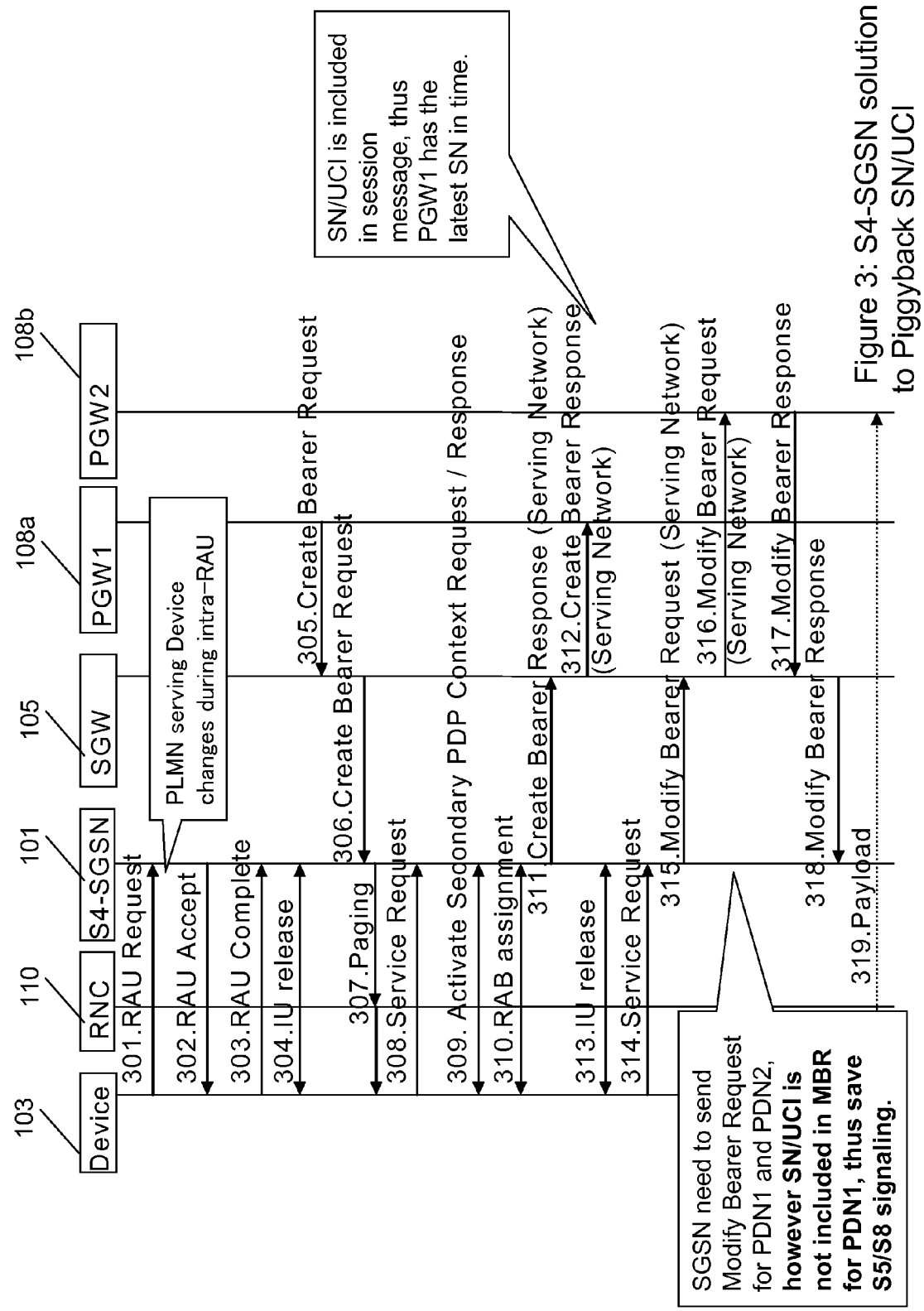
FIG. 3 is a signaling diagram illustrating embodiments of a non-mobility procedure in a communications network.

The non-mobility procedure with the S4-SGSN 101 solution to piggyback at least one of the serving network and time zone and UCI is illustrated in the signaling diagram in FIG. 3, which improves the S4/S11 and/or S5/S8 interface. In the non-mobility procedure exemplified in FIG. 3, the information about the time zone is already known by the SGW 105. In FIG. 3, the embodiment uses the S4-SGSN 101 as an example to fulfill the task of reporting at least one of the serving network and UCI via the S4/S11 and/or the S5/S8 interface independent from service request procedure, however a combined SGSN/MME may also be used. Instead, at least one of the serving network and UCI are piggybacked in the create bearer response message, step 312 in FIG. 3. Similarly, at least one of the serving network and UCI may be piggybacked to the SGW 105 in the update bearer response or the delete bearer response message (not shown in FIG. 3). This "Piggyback" solution for delivering at least one of the serving network and UCI is also applicable for the MME.

This "piggyback" solution saves the required modify bearer signaling to report the change of at least one of the serving network and UCI. When there is no dedicated signaling triggered by the PGW 108, additional modify bearer request messages which per PDN connection to report the change of at least one of the serving network and UCI are anyway needed. In the example embodiment in FIG. 3, the wireless device 103 has established two PDN connections, one towards the PGW1 108*a* and one towards the PGW2 108*b*.

The method for reporting of at least one of the serving network and UCI change without any S4-SGSN 101 change comprises the following steps, which steps may be performed in any suitable order:

Step 301

The wireless device 103 transmits a routing area update (RAU) request message to the S4-SGSN 101. The serving network of the wireless device 103 changes during intra-routing area update.

Step 302

The S4-SGSN 101 transmits a routing area update (RAU) accept message back to the wireless device 103.

Step 303

The wireless device 103 transmits a routing area update (RAU) complete message to the S4-SGSN 101.

Step 304

The Iu interface is released. The Iu interface is an external interface that connects a Radio Network Controller (RNC) 110 to the S4-SGSN 101 for packet switched traffic.

Step 305

The PGW1 108 transmits a create bearer request to the SGW 105.

Step 306

The SGW 105 forwards the create bearer request to the S4-SGSN 101.

Step 307

The S4-SGSN 101 transmits a paging message to the wireless device 103 via the RNC 110.

Step 308

The wireless device 103 transmits a service request to the S4-SGSN 101

Step 309

An activate secondary PDP context request and response is transmitted between the S4-SGSN 101 and the wireless device 103.

Step 310

Messages related to the radio access bearer assignment are transmitted between the S4-SGSN 101 and the wireless device 103 in order to establish one or more radio access bearers for the wireless device 103 and/or to modify or release already existing radio access bearers.

Step 311

The S4-SGSN 101 transmits a create bearer response, as a response to the request transmitted in step 306, to the SGW 105, preferably via the S4 interface. The create bearer response comprises information about at least one of the changed serving network and UCI, i.e. the information about the change is piggybacked on the create bearer response. The time zone is already known, and is therefore not necessarily transmitted in the non-mobility procedure.

Step 312

The SGW 105 forwards the create bearer response, comprising information about the changed serving network and/or UCI, to the PGW1 108*a*, thus PGW1 108*a* has the latest information about at least one of the serving network and UCI in time.

Step 313

The Iu interface between the wireless device 103 and the S4-SGSN 101 is released.

Step 314

The wireless device 103 transmits a service request to the S4-SGSN 101.

Step 315

The S4-SGSN 101 transmits a modify bearer request associated with PGW2 108*b* to the SGW 105, preferably via the S4 interface. The modify bearer request comprises information about the changed serving network and/or UCI, i.e. the information about the change is piggybacked on the modify bearer request.

The S4-SGSN needs to send a modify bearer request message for both the PGW1 108*a* and the PGW 108*b*, however information about the change of at least one of the serving network and UCI is not comprised in the modify bearer request for the PGW1, thus S5/S8 signaling is reduced.

Step 316

The SGW 105 forwards the modify bearer request comprising the information about the changed serving network and/or UCI to the PGW2 108.

Step 317

The PGW2 108*b* transmits a modify bearer response to the SGW 105.

Step 318

The SGW 105 forwards the modify bearer response to the S4-SGSN 101.

Step 319

The payload data is transmitted between the wireless device 103 and the PGW2 108*b*.

The non-mobility procedure was described above, and the mobility procedure will now be described below.

Serving Network/Time Zone/UCI Reporting with Change of Mobility Management Node (Mobility)

Figure 4:
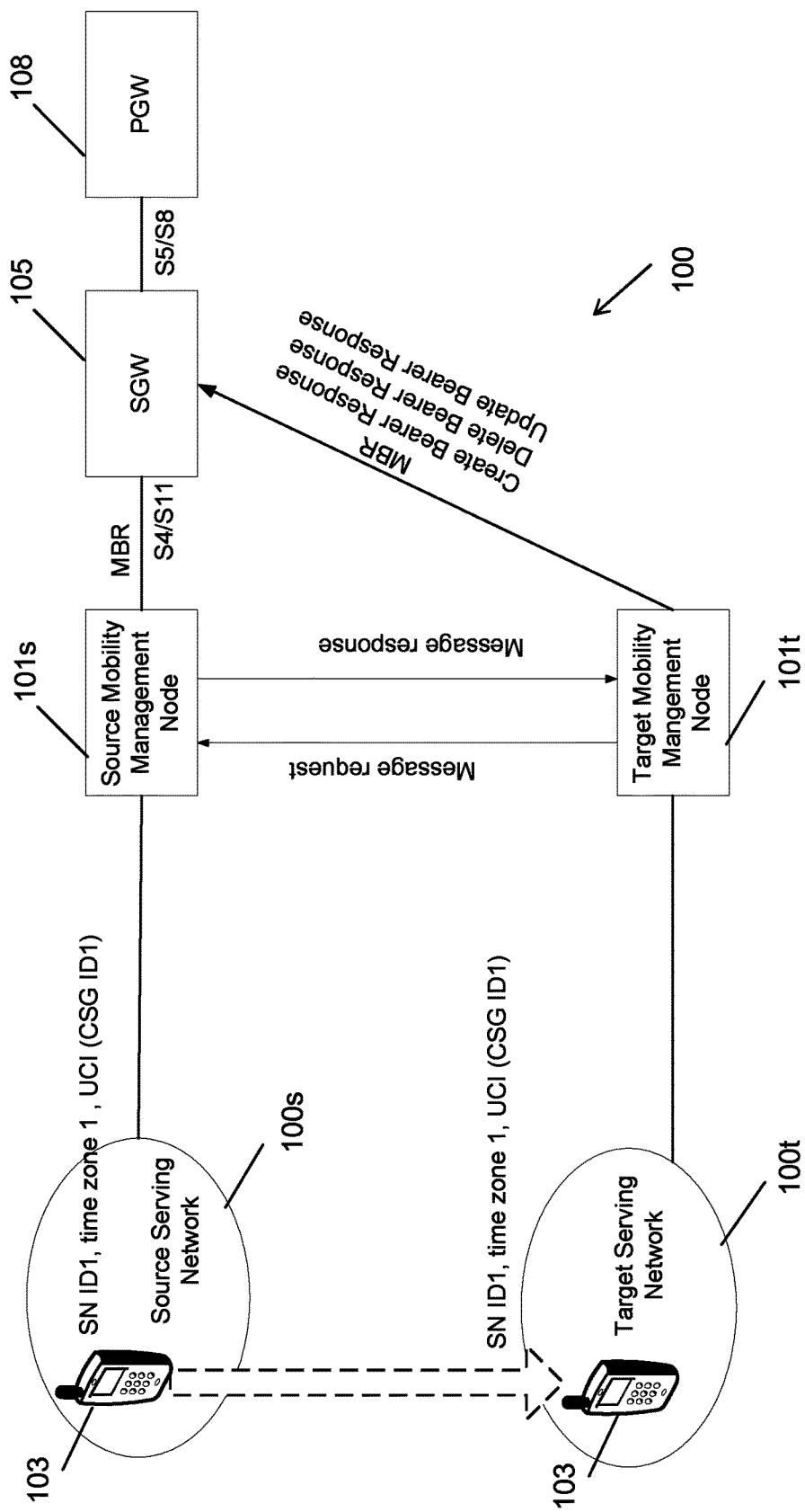
FIG. 4 is a schematic block diagram illustrating embodiments of a mobility procedure in a communications network.

FIG. 4 depicts an embodiment of the communications network 100 where the wireless device 103 changes from being served by a source serving network 100*s* to being served by a target serving network 100*t*, also referred to as the mobility procedure.

The communications network 100 comprises a source mobility management node 101*s* which is associated with the wireless device 103. The wireless device 103 is present in and served by the source serving network 100*s*. The wireless device 103 moves from the source serving network 100*s* to the target serving network 100*t*, and changes from being associated with the source mobility management node 101*s* to being associated with a target mobility management node 101*t*. In the mobility procedure exemplified in FIG. 4, the source mobility management node 101*s* may be a source S4-SGSN or a combined source SGSN/MME or a source MME, and the target mobility management node 101*t* may be a target S4-SGSN or a combined target SGSN/MME or a target MME. The target mobility management node 101*t* may transmit a message request to the source mobility management node 101*s*, and the source mobility management node 101*s* may transmit a message response back go the target mobility management node 101*t*.

The source serving network 100*s* and the target serving network 100*t* are identified with the same SN ID1. When the wireless device 103 is in the source serving network 100*s* or in the target serving network 100*t*, it is located in the time zone 1 and comprised in the UCI with the CSG ID1.

The source mobility management node 101*s* and the target mobility management node 101*t* are connected to the same SGW 105. When the source mobility management node 101*s* and the target mobility management node 101*t* are S4-SGSNs, the source mobility management node 101*s* and the target mobility management node 101*t* each has a S4 interface towards the SGW 105. When the source mobility management node 101s and the target mobility management node 101t are MMEs or combined SGSN/MMEs, the interface between each of the source mobility management node 101s and the target mobility management node 101t on one hand and the SGW 105 on the other hand is the S11 interface. The target mobility management node 101t may transmit a modify bearer request message, a create bearer response, a delete bearer response or an update bearer response to the SGW 105. The source mobility management node 101s may transmit a modify bearer request message to the SGW 105.

The SGW 105 is connected to the PGW 108 with the S5/S8 interface. As mentioned earlier, when the wireless device 103 is accessing multiple PDNs, there may be more than one PGW 108 for that wireless device 103, but only one PGW 108 is shown here for the sake of simplicity.

The messages transmitted between the network nodes illustrated in FIG. 4 will be described in more detail below with reference to FIGS. 5 and 6.

In one embodiment, an indication, e.g. in the form of an information element (IE), may indicate when there is any serving network and/or time zone and/or UCI changes that has not been reported yet. The indication may be called "Change Reported Flag" on PDN connection basis. In addition, in the existing GTPv2 specification, the current stored UCI in the source mobility management node 101s is preferably comprised in the context response message.

In another embodiment, the target mobility management node 101t may always provide at least one of the serving network and/or time zone and UCI indications in the Modify Bearer Request message as part of inter mobility management node mobility procedure, instead of comparing the target/current serving network 100t with the source serving network 100s. The SGW 105 may check at least one of the serving network and time zone and UCI indications received from the target mobility management node 101t. Only when the value of at least one of the serving network and time zone and/or UCI indications changes, the SGW 105 will forward at least one of the serving network and time zone and UCI indications to the PGW 108. Thus there will be no redundant signaling on the S5/S8 interface.

Figure 5:
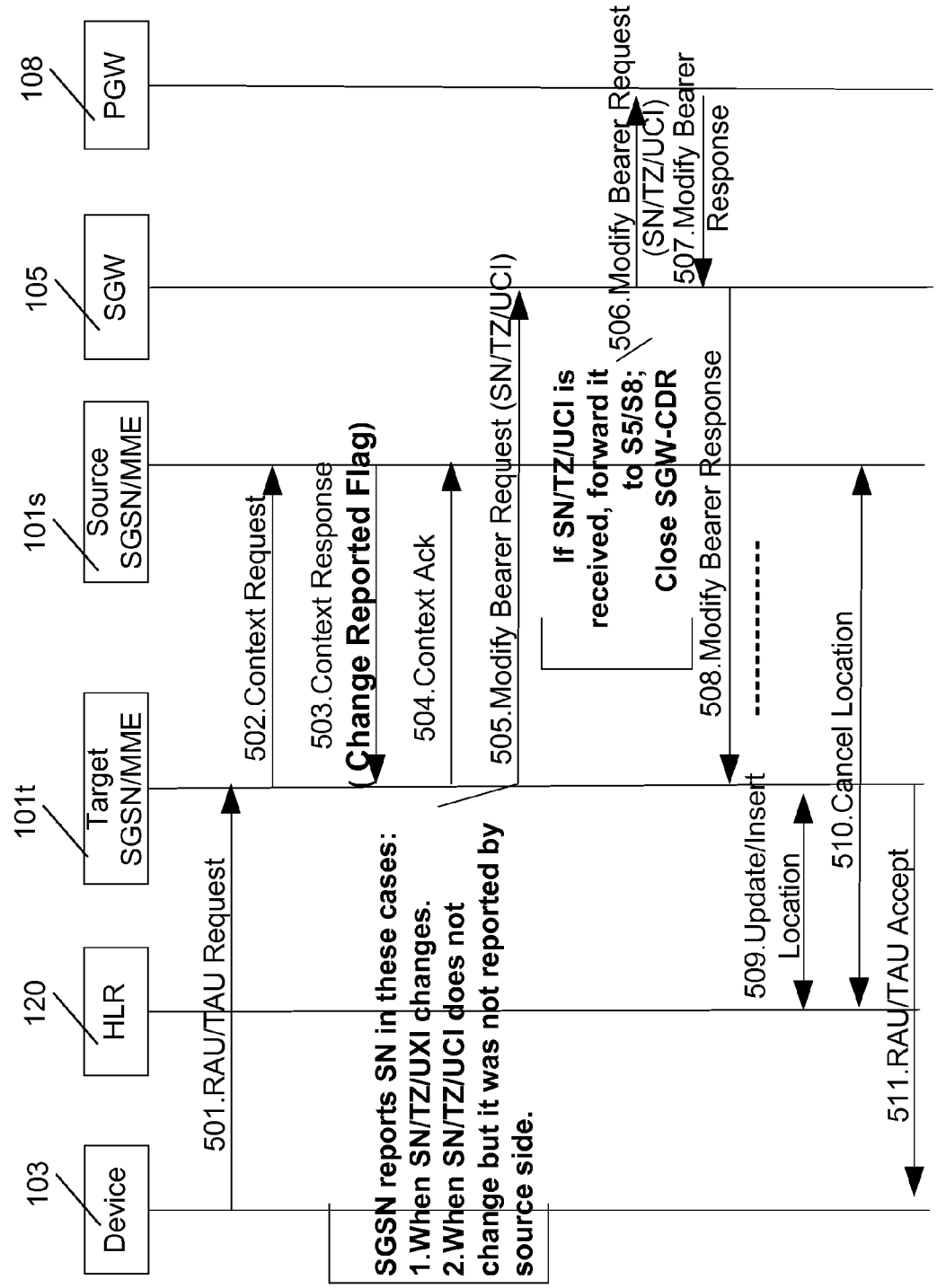
FIG. 5 is a signaling diagram illustrating embodiments of a mobility procedure in a communications network.

FIG. 5 illustrates embodiments of inter-mobility management node mobility, which improves the S10/S3/S16 interfaces. In FIG. 5, the mobility management node is exemplified with a combined SGSN/MME, but the mobility management node may also be a S4-SGSN or an individual MME. A precondition for the embodiments illustrated in FIG. is that the source mobility management node 101s supports the following functionality:

In the case of inter-mobility management node mobility, the source mobility management node 101s sets the report status per PDN connection to the target SGSN/MME 101t.

The target SGSN/MME 101t obtains information about at least one of the source serving network and time zone and UCI and compares it with at least one of the current target serving network and current time zone and current UCI for the wireless device 103. When they are different, the existing handling defined in 3GPP is kept to report at least one of the new serving network and time zone and UCI to the SGW 105.

When at least one of the serving network and time zone and UCI are not changed, the target SGSN/MME 101t needs to further check the indications to decide when at least one of the serving network and/or time zone and UCI will be reported or not.

When the indication, e.g. the "Change Reported Flag", indicates that the change was already reported to the SGW 105 in the source side, the target SGSN/MME 101t does not need to report it any more until at least one of the serving network and time zone and UCI changes again.

When the indication indicates that it was not reported in the source side, the target SGSN/MME 101t comprises at least one of the new serving network and/or time zone and/or UCI into the modify bearer request to inform the SGW 105 about at least one of the latest serving network and time zone and UCI.

The indication may be comprised in the forward relocation request message and/or the context response message. The indication may be defined as a bitmap style IE, where each bit corresponds to the report status for at least one of the serving network and time zone and UCI. Since the changes of at least one of the serving network and time zone and UCI are independent. FIG. 5 depicting the report of at least one of serving network and time zone and UCI during idle mode mobility procedure, e.g. routing area update/tracking area update comprises the following steps, which steps may be performed in any suitable order:

Step 501

When the wireless device 103 has detected that is has moved from the source serving network 100s to the target serving network 100t, the wireless device 103 transmits a routing area (RAU) update or a tracking area (TAU) update request to the target SGSN/MME 101t.

Step 502

The target SGSN/MME 101t transmits a context request to the source SGSN/MME 101s.

Step 503

The source SGSN/MME 101s transmits a context response message to the target SGSN/MME 101t. The context response message comprises the indication, e.g. a Change Reported Flag.

Step 504

The target SGSN/MME 101t transmits a context acknowledgement to the source SGSN/MME 101s.

Step 505

The target SGSN/MME 101t transmits a modify bearer request to the SGW 105, preferably via the S4 or the S11 interface. The modify bearer request comprises the information about at least one of the serving network and/or time zone and/or UCI. The information about at least one of the serving network and/or time zone and/or UCI is comprised in the modify bearer request in the following cases:

When at least one of the serving network and time zone and UCI has changed.

When at least one of the serving network and time zone and UCI has not changed but it was not reported by the source side.

Step 506

The SGW 105 forwards the modify bearer request to the PGW 108. The forwarded modify bearer request comprises the information about at least one of the serving network and time zone and UCI. This information is comprised in the modify bearer request when at least one of the serving network and time zone and UCI was received by the SGW 105 in step 505. The modify bearer request is transmitted via the S5/S8 interface, and the SGW 105 closes the SGW-CDR as a result.

Step 507

The PGW 108 transmits a modify bearer response to the SGW 105.

Step 508

The SGW 105 forwards the modify bearer response to the target SGSN/MME 101t.

Step 509

The target SGSN/MME 101t transmits information to a Home Location Register (HLR) 120 to update/insert the location of the wireless device 103 now being associated with the target SGSN/MME 101t. The HLR 120 is a database comprising details of each wireless device 103.

Step 510

The source SGSN/MME 101s transmits information to the HLR 120 to cancel the previous location of the wireless device 103 associated with the source SGSN/MME 101s.

Step 511

The target SGSN/MME 101t transmits a routing area update or a tracking area update accept message to the wireless device 103.

Figure 6:
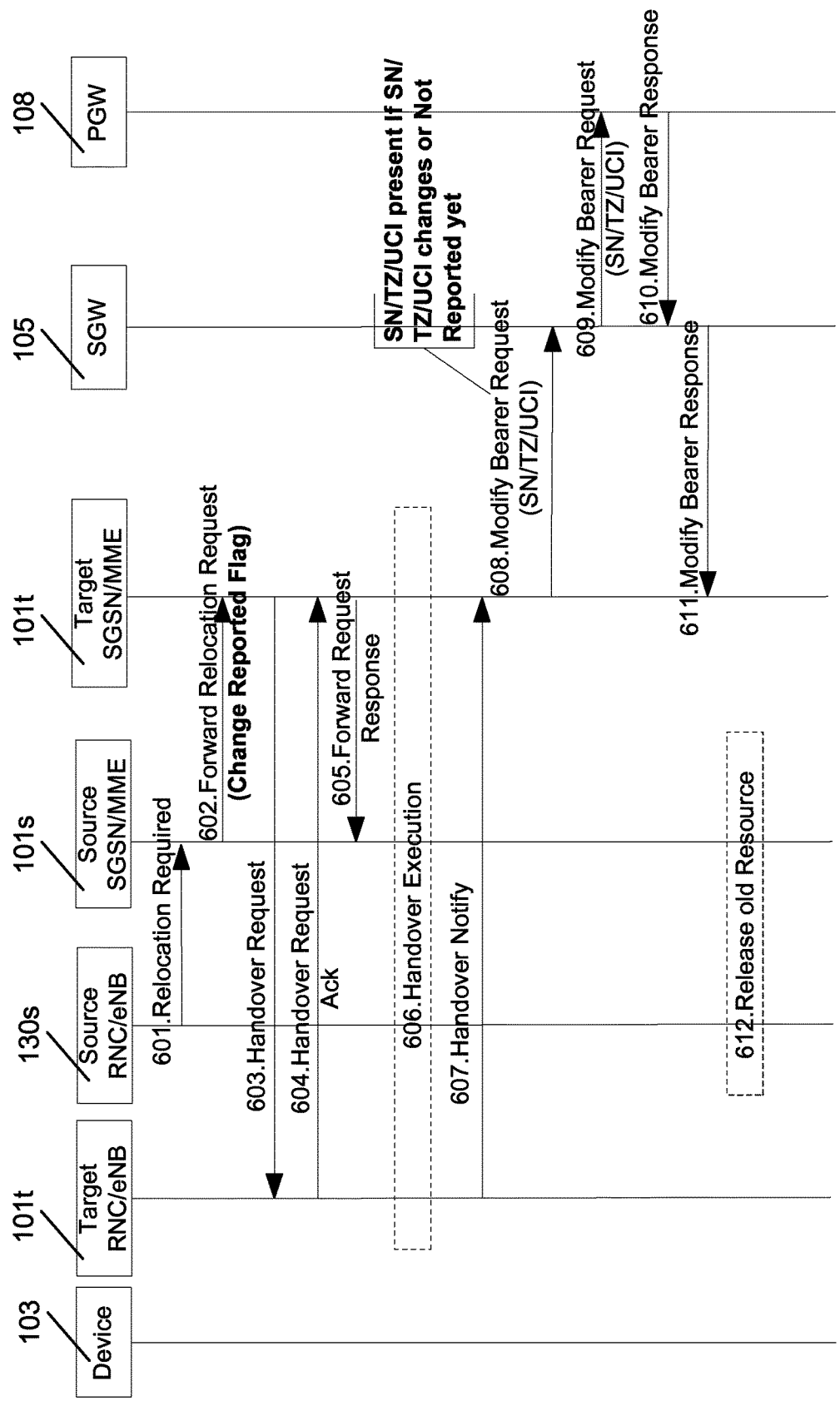
FIG. 6 is a signaling diagram illustrating embodiments of a mobility procedure in a communications network.

FIG. 6 illustrates an embodiment wherein the indication mentioned above is comprised in the forward relocation request message. As mentioned above, the indication indicates whether there is a change in serving network and/or time zone and/or UCI for the wireless device 103 that has not been reported to the SGW 105. In FIG. 6, the mobility management node is exemplified with a combined SGSN/MME, but the mobility management node may also be a S4-SGSN or an individual MME. The inter-mobility management node—handover procedure exemplified in FIG. 6 comprises the following steps, which steps may be performed in any suitable order:

Step 601

A source RNC/eNB 130s transmits a relocation required message to the source SGSN/MME 101s when the wireless device 103 has relocated from the source serving network 100s to the target serving network 100t.

Step 602

The source SGSN/MME 101s transmits a forward relocation required message to the target SGSN/MME 101t. The source SGSN/MME 101s comprises the indication mentioned above in the relocation required message.

Step 603

The target SGSN/MME 101t transmits a handover request to a target RNC/eNB 130t.

Step 604

The target RNC/eNB 130t transmits a handover request acknowledgement to the target SGSN/MME 101t.

Step 605

The target SGSN/MME 101t transmits a forward request response to the source SGSN/MME 101s.

Step 606

The handover of the wireless device 103 is executed.

Step 607

The target RNC/eNB 130t transmits a handover notify message to the target SGSN/MME 101t.

Step 608

The target SGSN/MME 101t transmits a modify bearer request to the SGW 105. The modify bearer request comprises information about at least one of the serving network and time zone and/or UCI when the information has changed and/or when the information (changed or not) has not been previously reported.

Step 609

The SGW 105 forwards the modify bearer request to the PGW 108. The forwarded modify bearer request comprises information about at least one of the serving network and time zone and UCI.

Step 610

The PGW 108 transmits a modify bearer response to the SGW 105.

Step 611

The SGW 105 forwards the modify bearer response to the target SGSN/MME 101t.

Step 612

The old resources, i.e. the source RNC eNB 130s and the source SGSN/MME 101s, are released.

In another embodiment, the target mobility management node 101t always comprises at least one of the serving network and/or time zone and UCI IE in the modify bearer request message, instead of comparing the current information about at least one of the serving network and time zone and UCI with the old serving network and/or time zone and/or UCI and be assisted by the indication. The SGW 105 will check at least one of the serving network and time zone and UCI information received from the target mobility management node 101t. Only when at least one of the serving network and time zone and UCI IE information changes, the SGW 105 forwards at least one of the serving network and time zone and UCI information to the PGW 108. Thus, there will be no redundant signaling on the S5/S8 interface.

Figure 7:
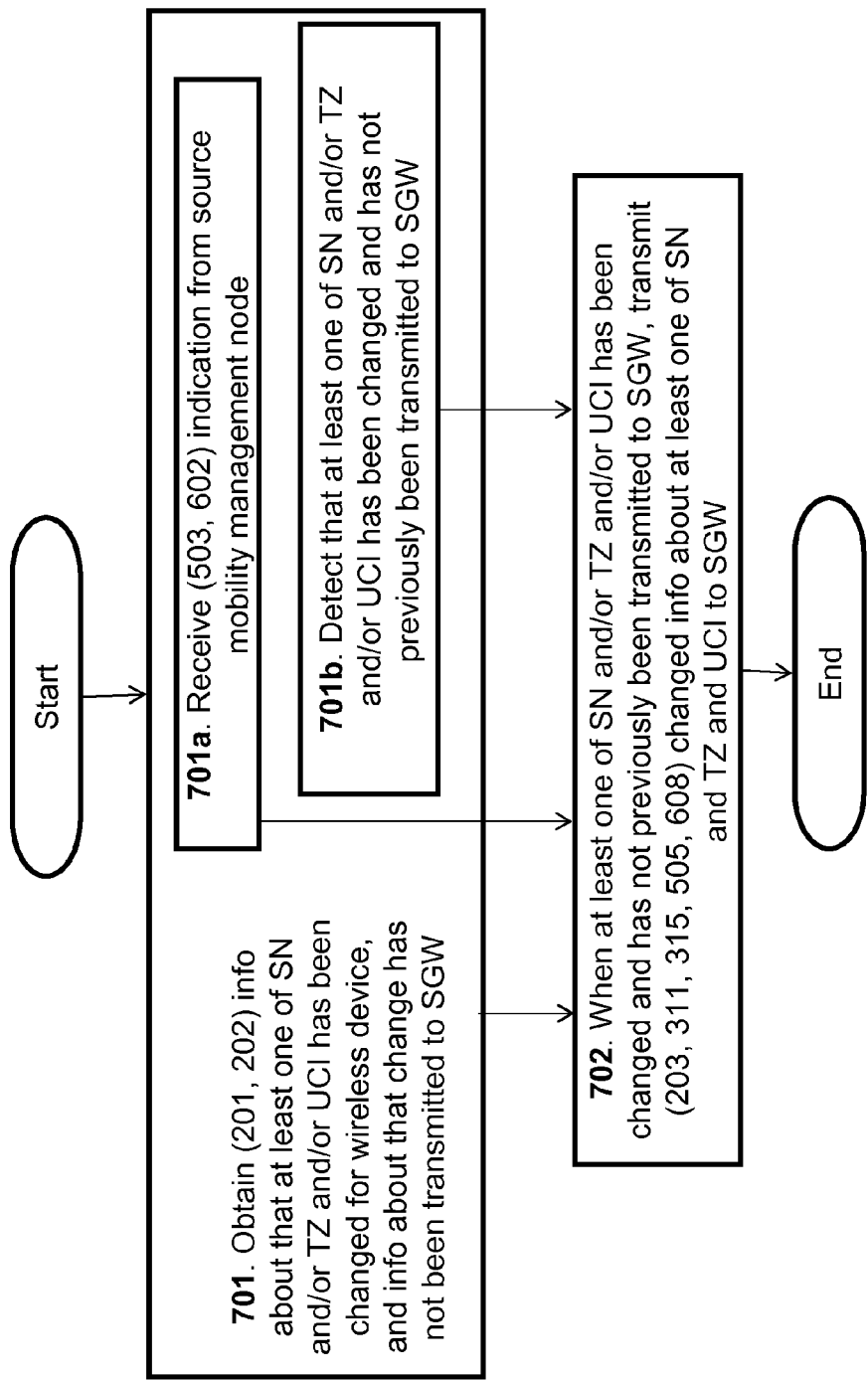
FIG. 7 is a flow chart illustrating embodiments of a method in a mobility management node.

The method described above will now be described seen from the perspective of the mobility management node 100, 100t. FIG. 7 is a flowchart describing the present method in the mobility management node 100, 100t, for handling information in a communications network 100. As mentioned above the mobility management node 101, 101t is associated with the wireless device 103 being served by the serving network 100, 100t. The mobility management node 101, 101t may be a MME or a S4-SGSN or a combined SGSN/MME in the mobility scenario and it may be a S4-SGSN or a combined SGSN/MME in the non-mobility scenario.

The method comprises the following steps to be performed by the mobility management node 100, 100t, which steps may be performed in any suitable order:

Step 701

This step corresponds to steps 201 and 202 in FIG. 2. The mobility management node 100, 100t obtains information about that at least one of the serving network 100, 100t and a time zone and the UCI has been changed for the wireless device 103, and information about that the change has not been transmitted to the SGW 105 associated with the mobility management node 101, 101t.

Step 701a

This step corresponds to step 503 in FIG. 5 and step 602 in FIG. 6. Step 701a is a substep of step 701. In some embodiments, e.g. in the mobility scenario, the mobility management node 101, 101t is a target mobility management node 101t associated with the wireless device 103 and the wireless device 103 has previously been associated with a source mobility management node 101s. The mobility management node 101t may receive an indication from the source mobility management node 101s. The indication indicates whether the information about the change has been transmitted to the SGW 105 or not.

For example, in the mobility scenario, the indication may be received in a context response message when the wireless device 103 is in idle mode, and the indication may be received in a forward relocation request message when the wireless device 103 is in active mode.

The indication may be an information element comprising bits. Each bit may correspond to a status for at least one the serving network and time zone and UCI. The status indicates whether the information about the change has been transmitted to the SGW 105 or not. The indication may be associated with one PDN connection of the wireless device 103 or individually associated with the wireless device 103. The indication may be a change reported flag.

Step 701*b*

This step is a substep of step 701, and a step that is performed instead of step 701*a*. In some embodiments, e.g. in a non-mobility scenario, the mobility management node 101, 101*t* detects that at least one of the serving network or time zone or UCI has been changed and that the information about the change has not been transmitted to the SGW 105.

Step 702

This step corresponds to step 203 in FIG. 2, step 311 and step 315 in FIG. 3, step 505 in FIG. 5 and step 608 in FIG. 6. When at least one of the serving network and the time zone and the UCI, has been changed for the wireless device 103, and information about the change has not been transmitted to the SGW 105, the mobility management node 100, 100*t* transmits the information about at least one of the changed serving network and time zone and UCI, to the SGW 105, enabling the SGW 105 to forward this information to the PGW 108.

In some embodiments, e.g. in the mobility scenario, the information about the change is transmitted in a modify bearer request when the indication indicates that information about the change has not been transmitted to the SGW 105.

In some embodiments, e.g. in a non-mobility scenario, the information about the change is transmitted to the SGW 105 in an update bearer response or a create bearer response or a delete bearer response when there is dedicated signaling triggered by the PGW 108.

In some embodiments, e.g. in a non-mobility scenario, the information about the change comprises information about at least one of the serving network and UCI.

In some embodiments, e.g. in a non-mobility scenario, the communications network 100 is based on UTRAN where a direct tunnel is not used in the communications network 100, or the communications network 100 is based on GSM where a direct tunnel is not existing in the communications network 100.

The information about at least one of the changed serving network and time zone and UCI may be transmitted to the SGW 105 with least signaling messages over a S11/S4 interface and a S5/S8 interface.

Figure 8:
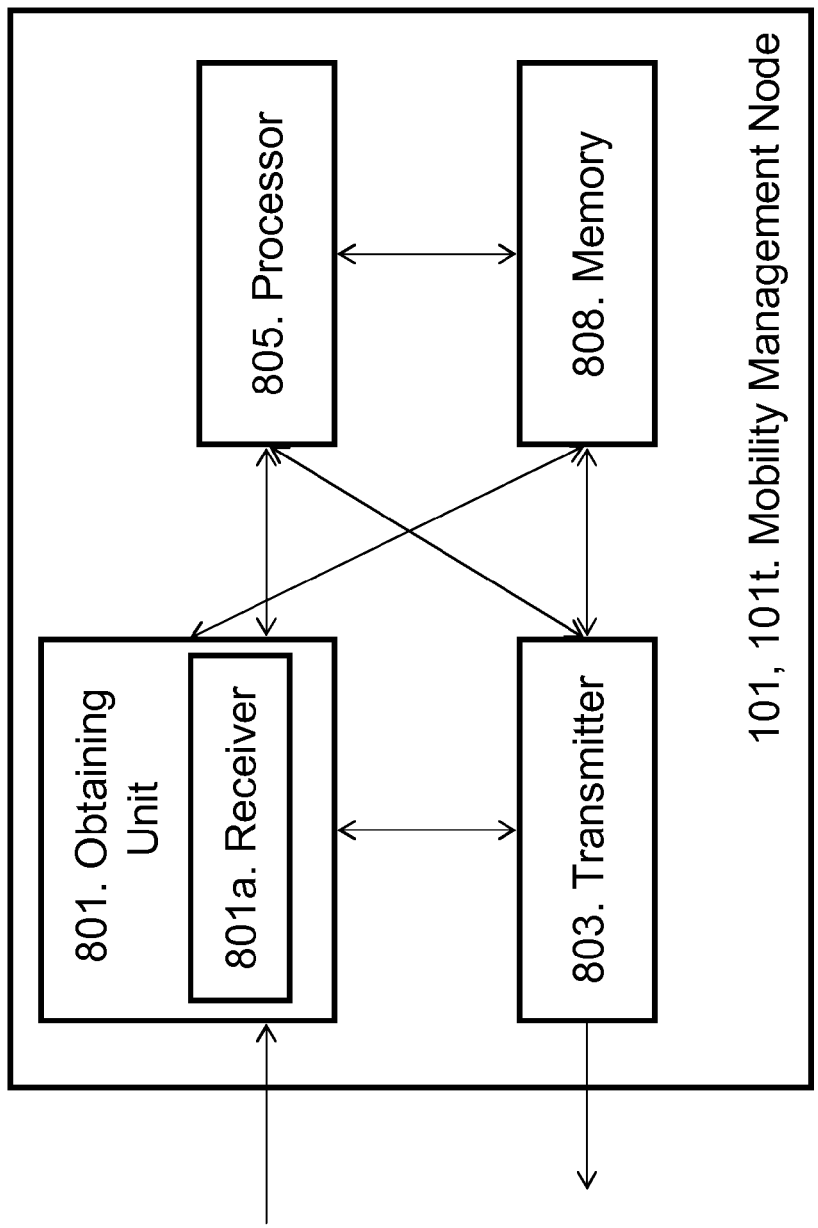
FIG. 8 is a schematic block diagram illustrating embodiments of a mobility management node.

To perform the method steps shown in FIG. 7 for handling information in a communications network 100 the mobility management node 100, 100*t* comprises an arrangement as shown in FIG. 8. The mobility management node 101, 101*t* is configured to be associated with a wireless device 103 being served by a serving network 100, 100*t*. In some embodiments, the mobility management node 101, 101*t* is a target mobility management node 101*t* associated with the wireless device 103 and the wireless device 103 has previously been associated with a source mobility management node 101*s*. In the mobility scenario, the mobility management node 101, 101*t* may be a standalone MME or a S4-SGSN or a combined SGSN/MME. In the non-mobility scenario, the mobility management node 101, 101*t* may be a S4-SGSN or a combined SGSN/MME. In some embodiments, the communications network 100 is based on UTRAN where a direct tunnel is not used in the communications network 100, or the communications network 100 is based on GSM where a direct tunnel does not exist in the communications network 100.

The mobility management node 101, 101*t* comprises an obtaining unit 801 which is configured to obtain information about that at least one of the serving network 100, 100*t* and a time zone and a UCI, has been changed for the wireless device 103, and information about that the change has not been transmitted to the SGW 105 associated with the mobility management node 101, 101*t*. In some embodiments, the obtaining unit 801 is configured to detect, in the mobility management node 101, 101*t*, that at least one of the serving network or time zone or UCI has been changed and that the information about the change has not been transmitted to the SGW 105.

In some embodiments, e.g. in the mobility scenario, the obtaining unit 801 is a receiver 801*a*. The receiver 801*a* is configured to receive an indication from the source mobility management node 101*s*. The indication may indicate whether the information about the change has been transmitted to the SGW 105 or not. The receiver 801*a* may be configured to receive the indication in a context response message when the wireless device 103 is in idle mode, and to receive the indication in a forward relocation request message when the wireless device 103 is in active mode. The indication may be an information element comprising bits. Each bit may correspond to a status for at least one the serving network and time zone and UCI, and the status may indicate whether the information about the change has been transmitted to the SGW 105 or not. The indication may be associated with one PDN, connection of the wireless device 103 or individually associated with the wireless device 103. The indication may be a change reported flag.

The mobility management node 101, 101*t* comprises a transmitter 803 which is configured to, when at least one of the serving network and the time zone and the UCI has been changed for the wireless device 103 and when information about the change has not been transmitted to the SGW 105, transmit the information about at least one of the changed serving network and time zone and UCI, to the SGW 105, enabling the SGW 105 to forward this information to the PGW 108. The transmitter 803 may be configured to transmit the information about the change in a modify bearer request when the indication indicates that information about the change has not been transmitted to the SGW 105. In some embodiments, the transmitter 803 is configured to transmit the information about the change to the SGW 105 in an update bearer response or a create bearer response or a delete bearer response when there is dedicated signaling triggered by the PGW 108. In some embodiments, the information about the change comprises information about at least one of the serving network and the UCI. In some embodiments, the transmitter 803 is configured to transmit the information about at least one of the changed serving network and time zone and UCI to the SGW 105 with least signaling messages over a S11/S4 interface and a S5/S8 interface.

The present mechanism for handling information in a communications network 100 may be implemented through one or more processors, such as a processor 805 in the mobility management node arrangement depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the mobility management node 101, 101*t* and. One such carrier may be in the form of a CD ROM disc. It is however feasible with other data carriers such as a memory stick. The computer program code may furthermore be provided as pure program code on a server and downloaded to the mobility management node 101, 101t.

The mobility management node 100, 100t may further comprise a memory 808 comprising one or more memory units. The memory 808 is arranged to be used to store data, received data streams, power level measurements, threshold values, time periods, configurations, schedulings, the change reported flag, information about at least one of the serving network and time zone and UCI, information about idle and/or connected mode of the wireless device 103, information elements, messages and applications to perform the methods herein when being executed in the mobility management node 101, 101t.

Those skilled in the art will also appreciate that the obtaining unit 801, the receiver 801a and the transmitter 803 as described above may refer to a combination of analog and digital circuits, and/or one or more processors configured with software and/or firmware, e.g. stored in a memory, that when executed by the one or more processors such as the processor 805 perform as described above.

Alternative embodiments of the mobility management node 100, 100t may comprise additional components beyond those shown in FIG. 8 that may be responsible for providing certain aspects of the mobility management nodes 100, 100t functionality, comprising any of the functionality described above and/or any functionality necessary to support the embodiments described above.

The communications network 100 may further comprise any additional elements suitable to support communication between communication network nodes. The illustrated communications network nodes may represent communications network nodes that comprise any suitable combination of hardware and/or software.

Summarized, the mobility management node 101, 101t has the following logic:
  When at least one of the serving network and time zone and UCI has changed, transmit at least one of the current serving network and current time zone and current UCI to the SGW 105.
  When at least one of serving network and time zone and UCI has not changed, but the indication indicates there is and pending change which has not been reported yet, transmit at least one of the current serving network and time zone and UCI to SGW 105.

For the non-mobility case, the embodiments herein are applicable to the S4-SGSN and the combined SGSN/MME. For the mobility case, the embodiments herein are applicable for the combined SGSN/MME, the standalone MME and the S4-SGSN.

In some embodiments, the Change Reported Flag is comprised in the context response and/or forward relocation request messages. This is in order correct an error case. In some embodiments, at least one of the serving network and time zone and/UCI is comprised in at least one of the create bearer response message and update bearer response message and delete bearer response message when there is a change. This is in order to optimize and to avoid S5/S8 signaling, e.g. MBR, to report the change.

Some embodiments described above may be summarized in the following manner:
  One embodiment is directed to a method in a mobility management node for handling information in a communications network, wherein the mobility management node is associated with a wireless device being served by a serving network. The method comprises: obtaining information about that at least one of the serving network or a time zone or a User Closed subscriber group Information, UCI, has been changed for the wireless device, and information about that the change has not been transmitted to a Serving GateWay, SGW associated with the mobility management node; and when at least one of the serving network and the time zone and the UCI, has been changed for the wireless device, and information about the change has not been transmitted to the SGW, transmitting the information about at least one of the changed serving network and time zone and UCI, to the SGW, enabling the SGW to forward this information to a Packet data network Gateway, PGW.

The method may be done as a reaction to or in response to receiving a request message (e.g. a service request or a RAU update or a TAU update request) from the wireless device or receiving a request message (e.g. a relocation request) from a source mobility management node in case the wireless device has previously been associated with a source mobility management node.

The mobility management node may be a target mobility management node associated with the wireless device and the wireless device may previously have been associated with a source mobility management node; and the obtaining information may then further comprise: receiving an indication from the source mobility management node, which indication indicates whether the information about the change has been transmitted to the SGW or not.

The indication may be received in a context response message when the wireless device is in idle mode, and wherein the indication is received in a forward relocation request message when the wireless device is in active mode.

The information about the change may be transmitted in a modify bearer request when the indication indicates that information about the change has not been transmitted to the SGW.

The indication may be an information element comprising bits, wherein each bit corresponds to a status for at least one the serving network and time zone and UCI, which status indicates whether the information about the change has been transmitted to the SGW or not.

The indication may be associated with one Packet Data Network, PDN, connection of the wireless device or individually associated with the wireless device.

The indication may be a change reported flag.

The mobility management node may be a S4-Serving General packet radio service Support Node, S4-SGSN or a Mobility Management Entity, MME, or a combined SGSN/MME.

The obtaining of information may further comprise: detecting, in the mobility management node that at least one of the serving network or time zone or UCI has been changed and that the information about the change has not been transmitted to the SGW.

The information about the change may be transmitted to the SGW in an update bearer response or a create bearer response or a delete bearer response when there is dedicated signaling triggered by the PGW.

The information about the change may comprise information about at least one of the serving network and UCI.

The mobility management node may be a S4-Serving General packet radio service Support Node, S4-SGSN or a combined SGSN/Mobility Management Entity, SGSN/MME.

The communications network may be based on Universal Terrestrial Radio Access Network, UTRAN where a direct tunnel is not used in the communications network, or the communications network may be based on Global System for Mobile Communications, GSM where a direct tunnel is not existing in the communications network.

The information about at least one of the changed serving network and time zone and UCI is transmitted to the SGW with least signaling messages over a S11/S4 interface and a S5/S8 interface.

Some other embodiments described above may be summarized in the following manner:

One embodiment may be directed to a mobility management node for handling information in a communications network, wherein the mobility management node is configured to be associated with a wireless device being served by a serving network. The mobility management node comprises: an obtaining unit configured to obtain information about that at least one of the serving network or a time zone or a User Closed subscriber group Information, UCI, has been changed for the wireless device, and information about that the change has not been transmitted to a Serving GateWay, SGW associated with the mobility management node; and a transmitter configured to, when at least one of the serving network and the time zone and the UCI has been changed for the wireless device, and information about the change has not been transmitted to the SGW, transmit the information about at least one of the changed serving network and time zone and UCI, to the SGW, enabling the SGW to forward this information to a Packet data network Gateway, PGW.

The obtaining unit may be configured to obtain the information as a reaction to or in response to receiving a request message from the wireless device or from a source mobility management node in case the wireless device has previously been associated with a source mobility management node.

The mobility management node may be a target mobility management node associated with the wireless device and the wireless device may previously have been associated with a source mobility management node; and wherein the obtaining unit is a receiver, which receiver is configured to receive an indication from the source mobility management node, which indication indicates whether the information about the change has been transmitted to the SGW or not.

The receiver may be configured to receive the indication in a context response message when the wireless device is in idle mode, and to receive the indication in a forward relocation request message when the wireless device is in active mode.

The transmitter may be configured to transmit the information about the change in a modify bearer request when the indication indicates that information about the change has not been transmitted to the SGW.

The indication may be an information element comprising bits, wherein each bit corresponds to a status for at least one the serving network and time zone and UCI, which status indicates whether the information about the change has been transmitted to the SGW or not.

The indication may be associated with one Packet Data Network, PDN, connection of the wireless device or individually associated with the wireless device.

The indication may be a change reported flag.

The mobility management node may be a S4-Serving General packet radio service Support Node, S4-SGSN or a Mobility Management Entity, MME or a combined SGSN/MME.

The obtaining unit is configured to detect, in the mobility management node that at least one of the serving network or time zone or UCI has been changed and that the information about the change has not been transmitted to the SGW.

The transmitter may be configured to transmit the information about the change to the SGW in an update bearer response or a create bearer response or a delete bearer response when there is dedicated signaling triggered by the PGW.

The information about the change comprises information about at least one of the serving network and the UCI.

The mobility management node may be a S4-Serving General packet radio service Support Node, S4-SGSN or a combined SGSN/Mobility Management Entity, SGSN/MME.

The communications network may be based on Universal Terrestrial Radio Access Network, UTRAN where a direct tunnel is not used in the communications network, or the communications network may be based on Global System for Mobile Communications, GSM where a direct tunnel is not existing in the communications network.

The transmitter may be configured to transmit the information about at least one of the changed serving network and time zone and UCI to the SGW with least signaling messages over a S11/S4 interface and a S5/S8 interface.

The embodiments described herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method in a mobility management node for handling information in a communications network, wherein the mobility management node is associated with a wireless device being served by a serving network, the method comprising:
   obtaining information for the wireless device that at least one of the serving network or a time zone or a User Closed subscriber group Information, UCI, has been changed, and information that the change has not been transmitted to a Serving GateWay, SGW associated with the mobility management node; and
   when at least one of the serving network and the time zone and the UCI, has been changed for the wireless device, and information about the change has not been transmitted to the SGW, transmitting the information about at least one of the changed serving network and time zone and UCI, to the SGW, enabling the SGW to forward this information to a Packet data network Gateway, PGW.

2. The method according to claim 1, wherein the obtaining is performed in response to receiving a request message from the wireless device or from a source mobility management node in case the wireless device has previously been associated with a source mobility management node.

3. The method according to claim 1, wherein the mobility management node is a target mobility management node associated with the wireless device and wherein the wireless device has previously been associated with a source mobility management node; and wherein the obtaining information further comprises:

receiving an indication from the source mobility management node indicating whether the information about the change has been transmitted to the SGW or not.

4. The method according to claim 3, wherein the indication is received in a context response message when the wireless device is in idle mode, and wherein the indication is received in a forward relocation request message when the wireless device is in active mode.

5. The method according to claim 3, wherein the information about the change is transmitted in a modify bearer request when the indication indicates that information about the change has not been transmitted to the SGW.

6. The method according to claim 3, wherein the indication is an information element comprising bits, wherein each bit corresponds to a status for at least one of the serving network and time zone and UCI, which status indicates whether the information about the change has been transmitted to the SGW or not.

7. The method according to claim 3, wherein the indication is associated with one Packet Data Network, PDN, connection of the wireless device or individually associated with the wireless device.

8. The method according to claim 3, wherein the indication is a change reported flag.

9. The method according to claim 3, wherein the mobility management node is a S4-Serving General packet radio service Support Node, S4-SGSN or a Mobility Management Entity (MME) or a combined SGSN/MME.

10. The method according to claim 1, wherein the obtaining information further comprises:

detecting, in the mobility management node, that at least one of the serving network or time zone or UCI has been changed and that the information about the change has not been transmitted to the SGW.

11. The method according to claim 10, wherein the information about the change is transmitted to the SGW in an update bearer response or a create bearer response or a delete bearer response when there is dedicated signaling triggered by the PGW.

12. The method according to claim 10, wherein the information about the change comprises information about at least one of the serving network and UCI.

13. The method according to claim 10, wherein the mobility management node is a S4-Serving General packet radio service Support Node, S4-SGSN or a combined SGSN/Mobility Management Entity, SGSN/MME.

14. The method according to claim 10, wherein the communications network is based on Universal Terrestrial Radio Access Network, UTRAN, where a direct tunnel is not used in the communications network, or wherein the communications network is based on Global System for Mobile Communications, GSM, where a direct tunnel is not existing in the communications network.

15. The method according to claim 1, wherein the information about at least one of the changed serving network and time zone and UCI is transmitted to the SGW with least signaling messages over a S11/S4 interface and a S5/S8 interface.

* * * * *

UNITED STATES PATENT AND TRADEMARK OFFICE
CERTIFICATE OF CORRECTION

PATENT NO. : 9,615,241 B2
APPLICATION NO. : 14/426020
DATED : April 4, 2017
INVENTOR(S) : Dong et al.

It is certified that error appears in the above-identified patent and that said Letters Patent is hereby corrected as shown below:

On the Title Page

On Page 2, in item (56), under "OTHER PUBLICATIONS", in Column 2, Line 2, delete "Taurau" and insert -- Tau/rau --, therefor.

In the Drawings

In Fig. 5, Sheet 5 of 8, delete "SN/TZ/UXI" and insert -- SN/TZ/UCI --, therefor.

In the Specification

In Column 8, Line 50, delete "LTE)," and insert -- LTE, --, therefor.

In Column 11, Line 29, delete "PGW1 108" and insert -- PGW1 108a --, therefor.

In Column 12, Line 12, delete "PGW 108b," and insert -- PGW2 108b, --, therefor.

In Column 12, Line 20, delete "PGW2 108." and insert -- PGW2 108b. --, therefor.

In Column 13, Line 49, delete "FIG." and insert -- FIG. 5 --, therefor.

In Column 16, Line 8, delete "RNC eNB" and insert -- RNC/eNB --, therefor.

In Column 21, Line 19, delete "SGW" and insert -- SGW, --, therefor.

In the Claims

In Column 22, Line 50, in Claim 1, delete "SGW" and insert -- SGW, --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*